US011772613B2

(12) United States Patent
Bott et al.

(10) Patent No.: US 11,772,613 B2
(45) Date of Patent: Oct. 3, 2023

(54) SECURING DEVICE FOR SECURING A STANDSTILL OF A VEHICLE

(71) Applicant: Dr. Ing. h.c. F. Porsche Aktiengesellschaft, Stuttgart (DE)

(72) Inventors: Michael Bott, Korntal-Muenchingen (DE); Bernhard Schweizer, Eutingen-Rohrdorf (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 122 days.

(21) Appl. No.: 16/856,200

(22) Filed: Apr. 23, 2020

(65) Prior Publication Data

US 2020/0339076 A1    Oct. 29, 2020

(30) Foreign Application Priority Data

Apr. 24, 2019   (DE) .................... 10 2019 110 571.4

(51) Int. Cl.
*B60T 1/00*         (2006.01)
*F16D 63/00*        (2006.01)

(52) U.S. Cl.
CPC ............ *B60T 1/005* (2013.01); *F16D 63/006* (2013.01)

(58) Field of Classification Search
CPC ............................... B60T 1/005; F16D 63/006
See application file for complete search history.

(56) References Cited

U.S. PATENT DOCUMENTS

| 1,154,041 | A  | * | 9/1915  | Morgan | B60T 1/005 188/60 |
| 1,334,147 | A  | * | 3/1920  | Finch  | B60T 1/005 188/30 |
| 8,033,348 | B1 | * | 10/2011 | Parkhe | B62B 9/085 180/19.1 |
| 2002/0020587 | A1 | * | 2/2002 | Song | B60T 1/005 188/18 A |
| 2006/0175783 | A1 | * | 8/2006 | Lan  | B62B 9/082 280/47.38 |
| 2008/0238042 | A1 | * | 10/2008 | Chen | B62B 7/10 280/650 |

(Continued)

FOREIGN PATENT DOCUMENTS

| CN | 102774278 A | 11/2012 |
| CN | 107743465 A | 2/2018 |

(Continued)

OTHER PUBLICATIONS

DE-102017112969 A1 English Machine Translation (Year: 2017).*
Chinese Office Action for Chinese Application No. 202010321975.X, dated Feb. 25, 2022, 6 pages.

*Primary Examiner* — Melody M Burch
(74) *Attorney, Agent, or Firm* — RatnerPrestia

(57) ABSTRACT

A securing device for securing a standstill of a vehicle, including a securing body having a bearing device for a movable bearing on the vehicle between a securing position (SP) and a release position (FP), and a counter-securing body having a fastening portion for a force-transmitting fastening to a wheel shaft of the vehicle. The counter-securing body includes at least one form-fitting portion for a form-fitting latching of a pawl portion of the securing body in its securing position (SP) and a release of the pawl portion of the securing body in its release position (FP).

21 Claims, 5 Drawing Sheets

(56) References Cited

U.S. PATENT DOCUMENTS

Figure 1:
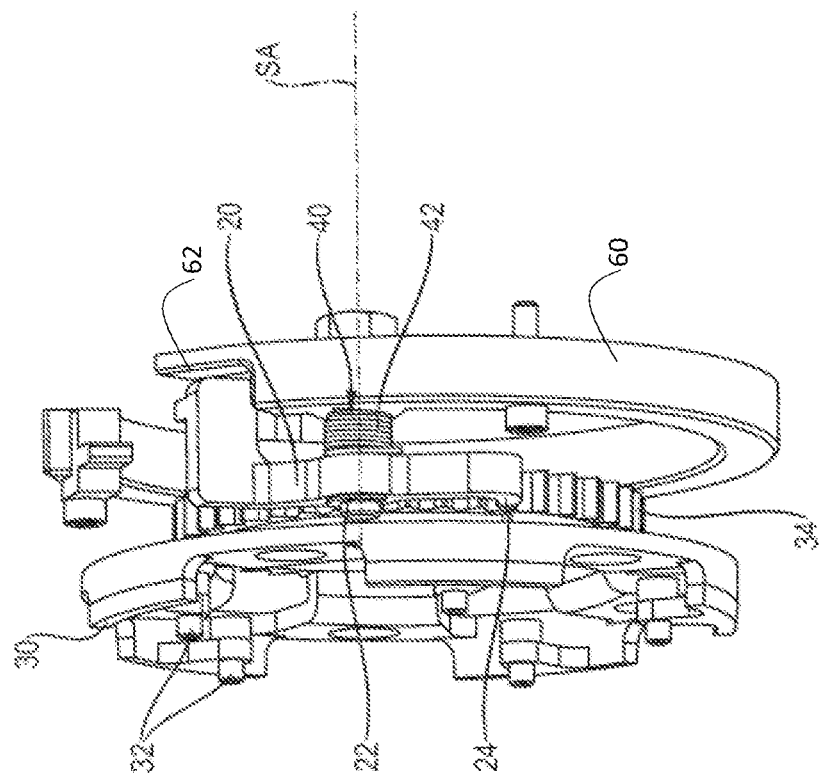

| | | | |
|---|---|---|---|
| 2010/0051395 A1* | 3/2010 | Sano | B60T 8/885 |
| | | | 188/162 |
| 2012/0285755 A1 | 11/2012 | Keller | |
| 2013/0162396 A1* | 6/2013 | Yang | A61G 5/0833 |
| | | | 701/22 |
| 2016/0229381 A1 | 8/2016 | Moroni et al. | |
| 2017/0114848 A1* | 4/2017 | Park | F16D 55/225 |
| 2018/0105149 A1* | 4/2018 | Yang | F16H 63/3441 |
| 2019/0056005 A1* | 2/2019 | Hall | F16D 69/02 |

FOREIGN PATENT DOCUMENTS

| | | | | |
|---|---|---|---|---|
| DE | 19800643 A1 | | 12/1998 | |
| DE | 102015200737 A1 | * | 7/2016 | ........... F16D 55/226 |
| DE | 102017112969 A1 | * | 12/2017 | ............. B60T 1/005 |
| DE | 102016214804 A1 | | 2/2018 | |
| KR | 20050106749 A | * | 11/2005 | |
| WO | 9108125 A1 | | 6/1991 | |

\* cited by examiner

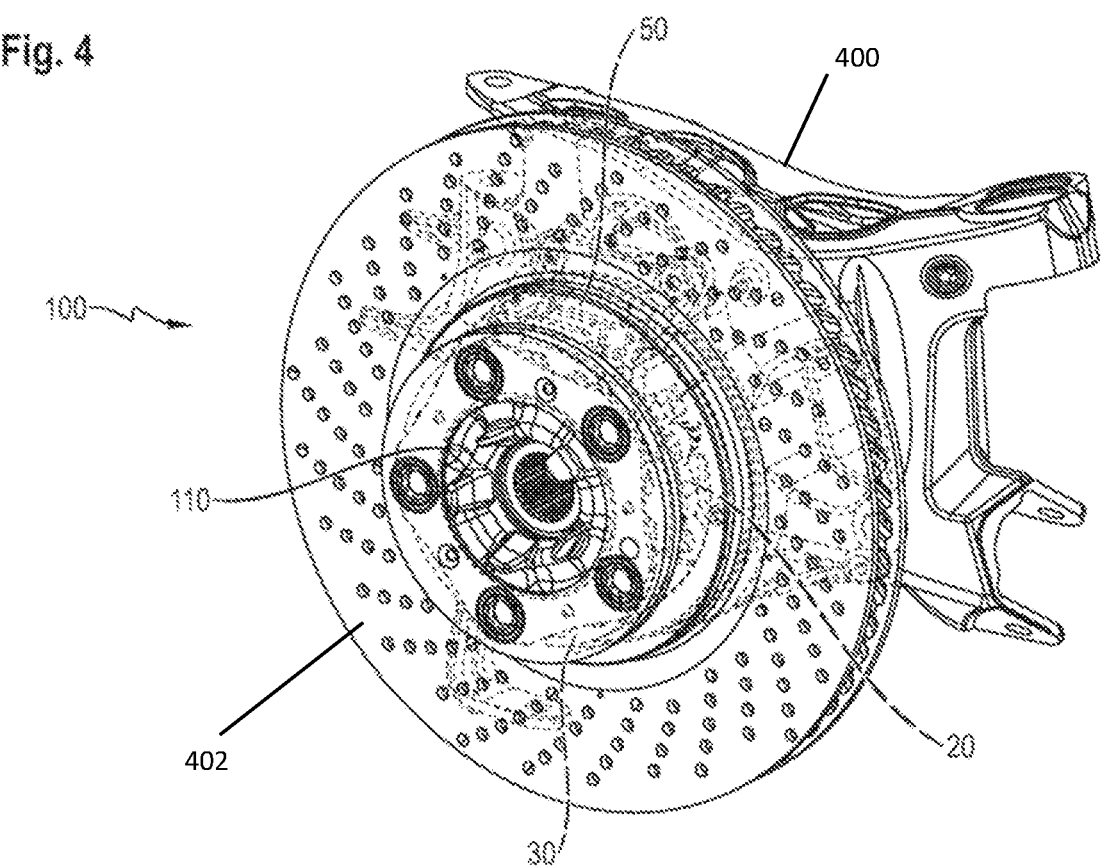

SECURING DEVICE FOR SECURING A STANDSTILL OF A VEHICLE

CROSS-REFERENCE TO RELATED APPLICATION

This application claims priority to German Patent Application No. 10 2019 110 571.4, filed Apr. 24, 2019, the content of such application being incorporated by reference herein in its entirety.

FIELD OF THE INVENTION

The present invention relates to a securing device for securing a standstill of a vehicle and to a method for activating such a securing device.

BACKGROUND OF THE INVENTION

It is known that vehicles comprise securing devices for securing a standstill of a vehicle. Such securing devices are customarily also known as parking brakes. If a vehicle is parked, it has to be secured against rolling away. In the simplest case, this occurs by engaging a transmission lock. In the case of manually shiftable vehicles, this is customarily ensured by engaging first gear. If the vehicle has an automatic transmission, a corresponding transmission lock of the automatic transmission is also known as park position of the transmission selector lever. If however, in addition to a normal standstill situation, the vehicle is parked on a slope, that is to say a downgrade force also acts on the vehicle in addition to the ambient forces, a parking brake also has to be provided as additional safeguarding of the standstill of the vehicle against rolling away. Known solutions are targeted at integrating the parking brake in the normal service brake system of the vehicle. It is thus possible with one and the same system to ensure the braking function for the vehicle during driving operation of the vehicle and additionally to make available the standstill safeguard in the standstill situation.

A disadvantage with the known solutions is that the integration of the parking brake in the normal brake system considerably increases the complexity thereof. In particular, the parking brake then acts on all four wheels or on at least two wheels of an axle and thus has a greater degree of complexity than is actually necessary for the pure safeguarding of the parking situation. This leads to increased structural outlay and thus to a higher weight and higher costs for the vehicle.

SUMMARY OF THE INVENTION

In view of the foregoing, it would be desirable to integrate a standstill safeguard in the vehicle in a cost-effective and simple manner.

Further features and details of the invention will emerge from the dependent claims, the description and the drawings. It goes without saying here that features and details which are described in connection with the securing device according to aspects of the invention according to aspects of the invention also apply in connection with the method according to aspects of the invention according to aspects of the invention, and conversely in each case, so that reference is or can always be made from one to the other with respect to the disclosure in respect of the individual aspects of the invention.

According to aspects of the invention, a securing device serves for securing a standstill of a vehicle. For this purpose, the securing device comprises a securing body having a bearing device for a movable bearing on the vehicle between a securing position and a release position. Furthermore, the securing device is equipped with a counter-securing body having a fastening portion for a force-transmitting fastening to a wheel shaft of a wheel. The counter-securing body is equipped here with at least one form-fitting portion for a form-fitting latching of a pawl portion of the securing body in its securing position. In the release position, the pawl portion of the securing body is released from the form-fitting portion.

According to aspects of the invention, the securing device is thus now a correlation of components and consequently a system independent of the normal brake system of the vehicle. The securing device is configured here with substantially two structural components. These are on the one hand the securing body and on the other hand the counter-securing body. In order to ensure the described parking brake or standstill safeguard, these two components can be arranged on different elements of the vehicle. On the one hand, the securing body can be mounted movably on the vehicle, for example on the body of the vehicle. On the other hand, the counter-securing body can be mounted on a wheel shaft of the vehicle. If a vehicle were to roll away in a standstill situation, this would be accompanied by a rotation of the respective wheel shaft or all wheels shafts. The concept according to aspects of the invention for standstill safeguarding is thus based on preventing this rotation of at least one single wheel shaft of the vehicle. In order to ensure this, a force which acts from outside on the vehicle and would produce a rotation of the wheel shaft has to be correspondingly absorbed and dissipated in the vehicle in order to avoid the rotation of the wheel shaft. Here, this absorption function is configured to be switchable according to aspects of the invention and operates as explained in the following paragraph.

If the vehicle is parked, the securing device is still situated in the normal operating mode, that is to say the securing body is in the release position. If the standstill safeguard is now activated, the securing body is moved from the release position into the securing position. Here, the pawl portion moves into the form-fitting portion of the counter-securing body in a latching manner, with the result that now a force transmission between the counter-securing body and the securing body is ensured. If a downgrade force now acts from outside on the wheel shaft or on the vehicle, this would cause the wheel shaft to rotate. However, this rotation is prevented since the acting force is not converted into movement but rather can be transmitted via the newly formed force path between form-fitting portion and pawl portion. The force introduced into the pawl portion is then further supported via the securing body and the movable bearing and thus the bearing device on the body of the vehicle. It is thus evident that, with a securing body in the securing position, a rotation of the wheel shaft is no longer possible, but rather the correspondingly acting forces are supported on the vehicle.

If a movement of the vehicle is now desired, for example by putting it into operation again, the securing device is deactivated by virtue of the securing body moving from the securing position into the release position again. Consequently, the form-fitting engagement between the pawl portion and form-fitting portion is canceled, with the result that a force transmission is also no longer present. In other words, forces can now act on the wheel shaft and also set it in rotation. It is unimportant here whether these rotational forces are introduced from outside or from inside by the drive of the vehicle.

According to aspects of the invention, a securing function is thus now ensured that provides movability between the securing position and the release position in particular by means of an automatic or electrically drivable actuator. A crucial advantage of the solution according to aspects of the invention is that the securing device is here designed to be purely mechanical and independent of the brake system of the vehicle. It is also advantageous that such a securing device, which can be designed to be very compact, can be arranged very close to the respective wheel of the vehicle. Consequently, the paths over which the force has to be transmitted through driven components of the vehicle in order to be supported can be reduced and thus lever forces can be minimized. The reduced complexity leads to reduced costs and a considerably simplified control possibility for controlling the securing function.

For the basic functionality, it is sufficient if at least one correlation between a form-fitting portion and a pawl portion is provided. However, since the wheel shaft customarily moves in a rotating manner during normal operation of the vehicle, the provision of two or considerably more form-fitting portions can afford many advantages in order to provide the desired securing function even in the case of a not exactly overlapping arrangement of the form-fitting portion and the pawl portion. Of course, the securing function according to the present invention functions both for active, that is to say driven, shafts and for passive wheel shafts of the vehicle.

Advantages are afforded if, in a securing device according to aspects of the invention, the fastening portion and/or the bearing portion are/is designed for a fastening and/or a bearing directly or substantially directly on a wheel suspension of the vehicle. This means that an arrangement also directly in the wheelhouse of the vehicle is possible. As has already been explained, the vicinity of the securing device to the operating location, namely the wheel shaft of the vehicle, leads to very short lever ratios and thus to reduced forces which can be supported in the vehicle. Moreover, the installation situation can be designed to be considerably more compact, with the result that a structural combination in the normal brake system without a combination of the function of these systems is possible. As is particularly evident with respect to the appended figures, a very compact design can provide for the securing device to be structurally and functionally separate from the service brake, but locally and geometrically integrated in the service brake.

Further advantages are afforded if, in a securing device according to aspects of the invention, the form-fitting portion is arranged, in particular fully circumferentially, on an outer side of the counter-securing body. What is concerned here for example is a form-fitting portion as part of a toothing, in particular an external toothing. Each of these individual teeth of this external toothing thus provides a latching position or a form-fitting position, with the result that the securing position can also be safely achieved for a wide variety of relative rotational positions between the pawl portion and the counter-securing body. The form-fitting portion and/or the pawl portion can here comprise corresponding guide surfaces in order to allow facilitated, in particular guided, latching in the securing position.

Moreover, it is advantageous, if in a securing device according to aspects of the invention, the bearing device is designed as a rotational bearing for a rotation of the securing body about a securing axis between the securing position and the release position. Such a bearing device as rotational bearing constitutes a particular simple and above all compact movement possibility. The corresponding securing axis is here arranged preferably centrally on the securing body or outside a respective end of the securing body in order as it were to provide a swinging movement or a tilting movement. In this way, the corresponding lever arms for the drive of the securing body can be still further reduced. In addition to the high degree of compactness of the movement and of the construction, a very cost-effective design can also be achieved in this way.

It is also advantageous if, in a securing device according to aspects of the invention, the securing body and/or the counter-securing body comprise/comprises a force-limiting means for limiting the force transmitted between the securing body and the counter-securing body. Such a force-limiting means can for example provide a corresponding securing force or limiting force which can take the form for example of spring loading. Such a force-limiting means, for example as a securing coupling, can be provided in a frictional or at least partially frictional manner. A spring-loaded pawl portion is also conceivable as such within the sense of this force-limiting means. This particularly allows a disengagement or cancelation of the force transmission between the securing body and the counter-securing body if a corresponding limit force threshold is exceeded. Here, the corresponding functionality and the advantages are explained in more detail in particular in the following section.

Thus, advantages are afforded if, in a securing device according to the above paragraph, the force-limiting means has a defined force threshold above which the force transmission between the securing body and the counter-securing body is limited and/or canceled. This means that the force transmission depends not only on the latching in the form-fitting portion but moreover also on the size of the transmitted force. If the securing body is situated in the securing position, it is designed for the force transmission between the securing body and counter-securing body. If now, for example by the action of external forces on the vehicle, the correspondingly transmitted force between the securing body and counter-securing body increases, this could lead above a defined force threshold to damage to the securing body or to the counter-securing body. Reference should be made here for example to a towaway situation of the vehicle. In an unsecured case, this would lead, with the pawl portion latched in, to the possibility of the latter breaking off and thus no longer being available for a subsequent securing function. The force threshold is now preferably designed such that it limits or cancels the force transmission below the mechanical loading limit of the securing body and of the counter-securing body. If the force-limiting means is designed for example as a coupling device, a spinning movement will limit the force transmission. If the force-limiting means is designed for example for disengaging the securing body, the securing position will be canceled and in particular the securing body will be moved back into the release position. In both ways, the maximum transmitted force between the securing body and counter-securing body will be limited and hence these two components will be protected from mechanical damage. This force threshold is preferably not only predefined but also designed to be adjustable. An electronic and controllable adjustment capability is also conceivable here in principle. The force-limiting means is preferably designed here in such a way that, after this force threshold has been subsequently undershot, the securing body can again, with the counter-securing body, ensure the complete force transmission.

Further advantages can be achieved if, in a securing device according to aspects of the invention, the force-limiting means comprises a spring element for forming a spring-force-loaded force transmission between the securing body and the counter-securing body. Here, too, frictional coupling elements are again conceivable just as spring-loaded backward movements of the securing body itself. The spring element can here provide in particular also a restoring force in the direction of the release position and thus offers a particularly simple and cost-effective solution for a force-limiting means.

Moreover, it is advantageous, if in a securing device according to aspects of the invention, an actuation device is provided for applying an actuator force to the securing body for movements between the release position and the securing position. Such an actuator device can for example take the form of an electric motor which differs in particular from a hydraulic functioning of the normal service brake. This means that a yet more simple, cost-effective and more compact actuator possibility is made available. In particular, the actuator force can be designed to act in both directions, that is to say for the movement from the release position into the securing position and conversely from the securing position into the release position.

The present invention also relates to a method for activating a securing function for securing a standstill of a vehicle having a securing device according to aspects of the invention, comprising the following steps:
  detecting a standstill situation of the vehicle,
  moving the securing body from the release position into the securing position so as to create a form fit between the pawl portion and the form-fitting portion of the counter-securing body.

A method according to aspects of the invention affords the same advantages as have been comprehensively explained with reference to a securing device according to aspects of the invention. For the detection of the standstill situation, not only detections by sensor means but also the detection of an activation requirement of the driver can be possible here. In principle, this safeguarding is combined with an already known transmission lock, that is to say for example the park position of an automatic transmission.

It is advantageous if, in a method according to aspects of the invention, a transmission locking device of the vehicle is activated at least partially simultaneously with the movement of the securing body into the securing position. By this is meant that a double safeguard is achieved. Firstly, the normal transmission in the parked position will provide the corresponding transmission locking function, and the securing device will now in parallel also form a parking brake as standstill safeguard.

Further advantages, features and details of the invention will emerge from the following description in which exemplary embodiments of the invention are described in detail with reference to the drawings. Here, the features mentioned in the claims and in the description may be essential to the invention in each case individually by themselves or in any desired combination.

BRIEF DESCRIPTION OF THE DRAWING FIGURES

Figure 6:
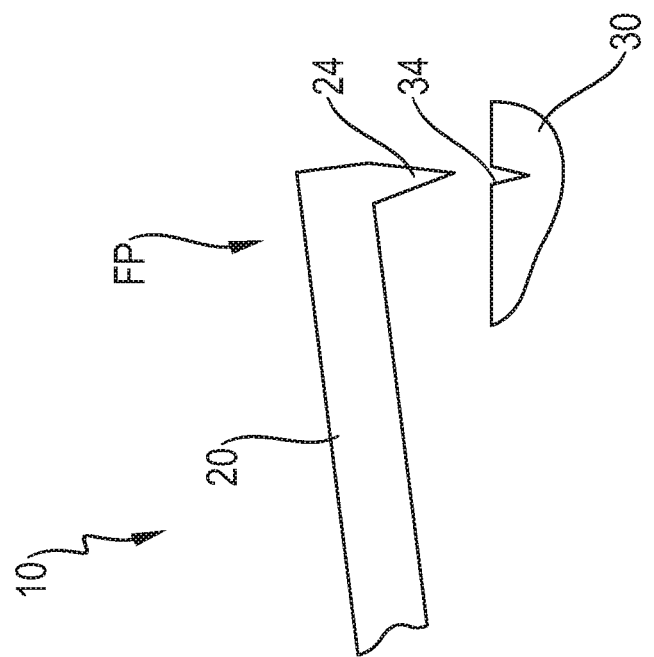
Figure 5:
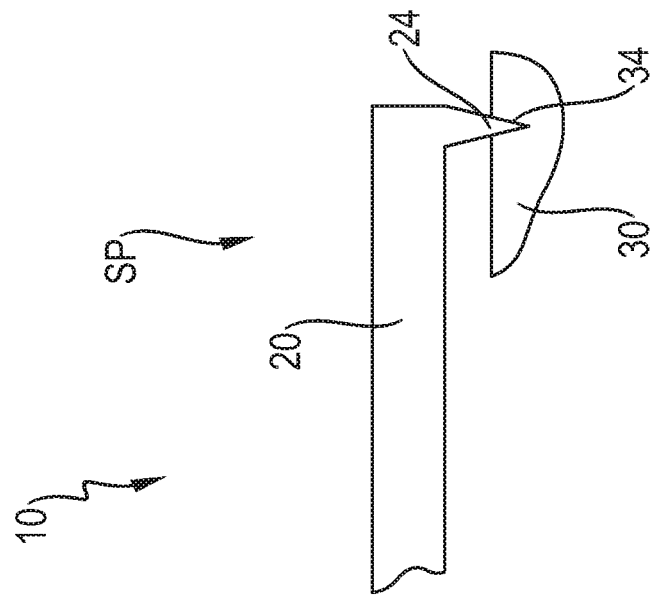

In the drawings:
FIG. 1 schematically shows one embodiment of a securing device according to aspects of the invention,
FIG. 2 schematically shows the embodiment of FIG. 1 when attached to the vehicle,
FIG. 3 schematically shows the embodiment of FIGS. 1 and 2 in a different view,
FIG. 4 schematically shows the embodiment of FIGS. 1 to 3 with brake disk fitted,
FIG. 5 schematically shows a schematic illustration of the securing device in the release position, and
FIG. 6 schematically shows a schematic illustration of FIG. 5 with the securing device in the securing position.

DETAILED DESCRIPTION OF THE INVENTION

FIG. 1 schematically shows, in a situation represented in isolation, how the securing device 10 is formed. It comprises here substantially two basic constituent parts. Firstly, this is a movable securing body 20 which is mounted by means of a bearing device 22 so as to be movable about a securing axis SA. The second basic component is here the counter-securing body 30. This counter-securing body 30 here comprises a plurality of bolts which serve as fastening portions 32 for fastening to a wheel shaft 110. The corresponding correlation of movements will be explained below with reference to the following figures. Furthermore, a force-limiting means 40 can also be seen in FIG. 1. This force-limiting means is in this embodiment a spring element 42 which applies a force to the securing body 20 in the direction of the release position FP. As soon as the transmission force between the securing body 20 and the counter-securing body 30 exceeds a predefined force threshold, the pawl portion 24 disengages from the associated form-fitting portion 34 and, by enabling the relative movement, now protects the individual components from mechanical damage. The securing body 20 is mounted to wheel suspension 60 by force-limiting means 40. One end of securing body 20 is positioned within a channel 62 formed in wheel suspension 60.

Figure 2:
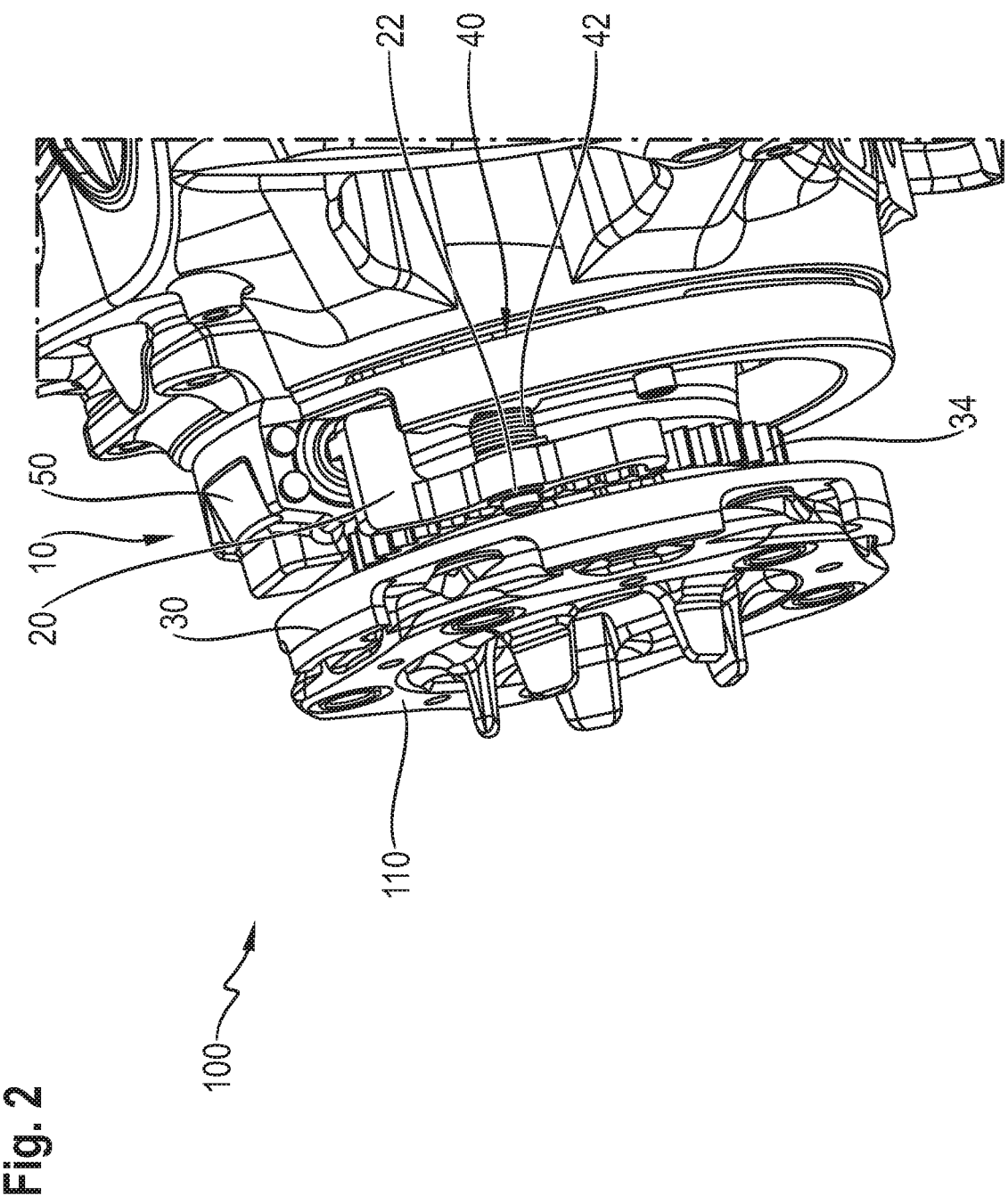
Figure 3:
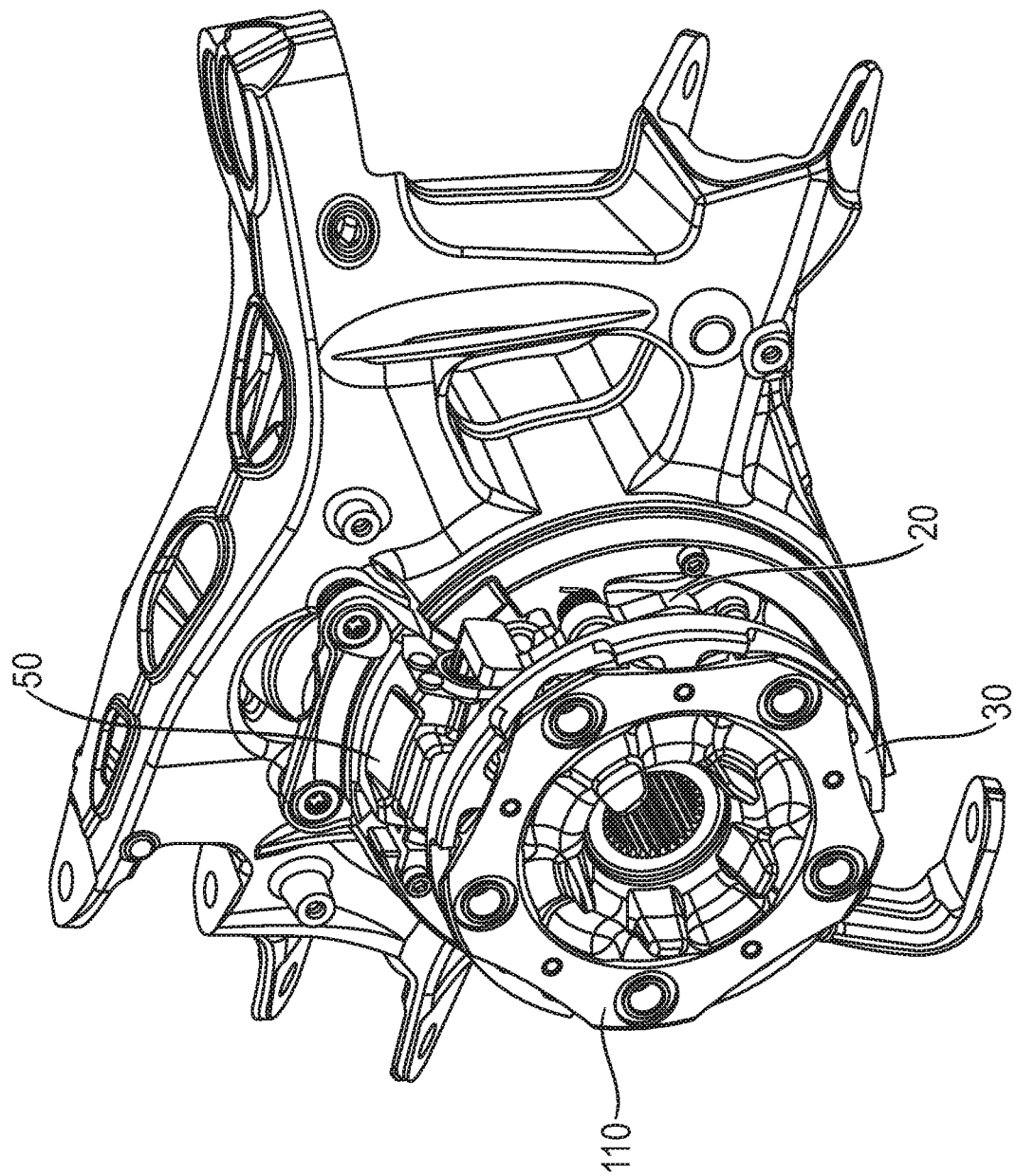

The integration of the securing device 10 in the vehicle 100 and in the wheel shaft 110 there can be clearly seen from FIGS. 2 and 3. There can thus clearly been seen here the arrangement between the body 400 of the vehicle 100 and the attachment to a brake disk, as is shown in particular in FIG. 4. The securing device 10 is now integrated between the body 400 and the brake disk (rotor) 402 of the wheel shaft 110 of the vehicle 100, as has been explained with reference to FIG. 1. An actuator device 50 allows the securing body 20 to be moved between a securing position SP and a release position FP, Independent of the actuation device 50, the force-limiting means 40 also applies the force limitation explained. In this view of FIGS. 2 and 3, the fastening portion 32 has already been mounted on the wheel shaft 110. FIG. 4 shows in particular how compact the securing device 10 can be designed to be. Thus, it can be arranged behind the brake disk 402 on the wheel shaft 110 of the vehicle 100 without or only with minimal additional installation space requirement.

The supporting force transmission function is here illustrated in particular in FIGS. 5 and 6. The counter-securing body 30 is thus schematically designed here with a single form-fitting portion 34. As in particular FIGS. 1 and 2 clearly show, these form-fitting portions 34, preferably as external toothing, are arranged repeatedly, in particular multiply, circumferentially around the counter-securing body 30. In a normal operating situation, that is to say during the driving operation of the vehicle, the securing body 20 is situated in the release position FP of FIG. 5, which thus means that the pawl portion 24 is arranged out of engagement with the form-fitting portion 34. As soon as the standstill safeguard is intended to be switched on and activated, in particular parallel to a transmission lock of the normal transmission of the vehicle 100, there occurs a rotational movement of the securing body 20 from the release position FP of FIG. 5 into the securing position SP of FIG. 6. Here, the pawl portion 24 latches in a form-fitting manner and thus in a force-transmitting manner into the form-fitting portion 34 of the counter-securing body 30, with the result that a force transmission from the counter-securing body 30 into the securing body 20 occurs.

The foregoing explanation of the embodiments describes the present invention exclusively within the context of examples. Of course, individual features of the embodiments may, where technically feasible, be freely combined with one another without departing from the scope of the present invention.

What is claimed:

1. A securing device for securing a standstill of a vehicle, said securing device comprising:
   a rotatable wheel shaft of the vehicle having a front side that is fixedly connected to a brake disc rotor and a rear side that is opposite the front side,
   a securing body that is configured to be mounted to the vehicle by a bearing device, said securing body being movable between a securing position (SP) and a release position (FP) and
   a counter-securing body that is fixed to the rear side of the rotatable wheel shaft, the counter-securing body having a fastening portion for a force-transmitting fastening to the wheel shaft of the vehicle, wherein the counter-securing body comprises at least one form-fitting portion in the form of gear teeth disposed on an outer exterior circumferential surface of the counter-securing body for (i) a form-fitting latching to a pawl portion of the securing body in the securing position (SP) and (ii) a release of the pawl portion of the securing body in the release position (FP),
   wherein the bearing device is a rotational bearing that guides rotation of the securing body about a securing axis (SA) between the securing position (SP) and the release position (FP),
   wherein the securing body and/or the counter-securing body comprise/comprises a force-limiting means for limiting a force transmitted between the securing body and the counter-securing body,
   wherein the force-limiting means comprises a spring element for transmitting force between the securing body and the counter-securing body, and
   wherein the spring element is a torsion spring having a torsion axis that is aligned with an axis of rotation of the securing body, and wherein the torsion spring is configured to release the securing body from the counter-securing body when a force between the securing body and the counter-securing body exceeds a predefined force threshold.

2. The securing device as claimed in claim 1, wherein the fastening portion and/or the bearing device are/is configured for a fastening and/or a bearing directly or substantially directly on a wheel suspension of the vehicle.

3. The securing device as claimed in claim 2, wherein the securing body is mounted between the wheel suspension and the rear side of the rotatable wheel shaft.

4. The securing device as claimed in claim 2, the wheel suspension includes a channel in which the securing body is movably positioned.

5. The securing device as claimed in claim 1, wherein the securing body is an elongated body having an external tooth that is configured to be releasably engaged with the gear teeth of the counter-securing body.

6. The securing device as claimed in claim 1, wherein the rotatable wheel shaft has a longitudinal axis, and the securing body is positioned further away, in a radial direction, from the longitudinal axis as compared with the gear teeth of the counter-securing body.

7. The securing device as claimed in claim 1, further comprising the brake disc rotor.

8. A motor vehicle comprising the securing device as claimed in claim 1.

9. The securing device as claimed in claim 1, wherein the securing body does not directly engage the brake disc rotor.

10. The securing device as claimed in claim 9, wherein the securing body is fixed along the securing axis.

11. The securing device as claimed in claim 1, wherein the torsion spring has a coiled body.

12. The securing device as claimed in claim 1, wherein the securing axis is oriented parallel to a rotational axis of the wheel shaft.

13. The securing device as claimed in claim 1, wherein the axis of rotation of the securing body, the torsion axis and an axis of rotation of the rotatable wheel shaft are parallel to each other.

14. The securing device as claimed in claim 1, wherein the torsion spring is biased to rotate the securing body away from the counter securing body.

15. The securing device as claimed in claim 14, further comprising an actuator device for applying an actuator force to the securing body to move the securing body against the bias of the torsion spring from the release position (FP) to the securing position (SP).

16. A method for activating a securing function for securing a standstill of a vehicle having a securing device including (i) a rotatable wheel shaft of the vehicle having a front side that is fixedly connected to a brake disc rotor and a rear side that is opposite the front side, (ii) a securing body that is configured to be mounted to a vehicle by a bearing device, said securing body being movable between a securing position (SP) and a release position (FP), and (iii) a counter-securing body that is fixed to the rear side of the rotatable wheel shaft, the counter-securing body having a fastening portion for a force-transmitting fastening to a wheel shaft of the vehicle, wherein the counter-securing body comprises at least one form-fitting portion in the form of gear teeth disposed on an outer exterior circumferential surface of the counter-securing body for (i) a form-fitting latching of a pawl portion of the securing body in the securing position (SP) and (ii) a release of the pawl portion of the securing body in the release position (FP), wherein the bearing device is a rotational bearing that guides rotation of the securing body about a securing axis (SA) between the securing position (SP) and the release position (FP), wherein the securing body and/or the counter-securing body comprise/comprises a force-limiting means for limiting a force transmitted between the securing body and the counter-securing body, wherein the force-limiting means comprises a spring element for transmitting force between the securing body and the counter-securing body, and wherein the spring element is a torsion spring having a torsion axis that is aligned with an axis of rotation of the securing body, and wherein the torsion spring is configured to release the securing body from the counter-securing body when a force between the securing body and the counter-securing body exceeds a predefined force threshold, said method comprising the following steps:
- detecting a standstill of the vehicle,
- rotating the securing body from the release position (FP) into the securing position (SP) so as to create a form fit between the pawl portion and the form-fitting portion of the counter-securing body, and
- releasing the securing body from the counter-securing body when the force between the securing body and the counter-securing body exceeds the predefined force threshold.

17. The method as claimed in claim 16, further comprising activating a transmission locking device of the vehicle at least partially simultaneously with the movement of the securing body into the securing position (SP).

18. The method as claimed in claim 16, wherein the securing axis is oriented parallel to a rotational axis of the wheel shaft.

19. The method as claimed in claim 16, wherein the axis of rotation of the securing body, the torsion axis and an axis of rotation of the rotatable wheel shaft are parallel to each other.

20. The method as claimed in claim 16, wherein the torsion spring is biased to rotate the securing body away from the counter securing body.

21. The method as claimed in claim 20, further comprising an actuator device for applying an actuator force to the securing body to move the securing body against the bias of the torsion spring from the release position (FP) to the securing position (SP).

* * * * *